Jan. 9, 1951  A. B. NEWTON  2,537,367
DRIVE FOR AIR CONTROLLING GRILLES
Filed July 2, 1948  2 Sheets-Sheet 2
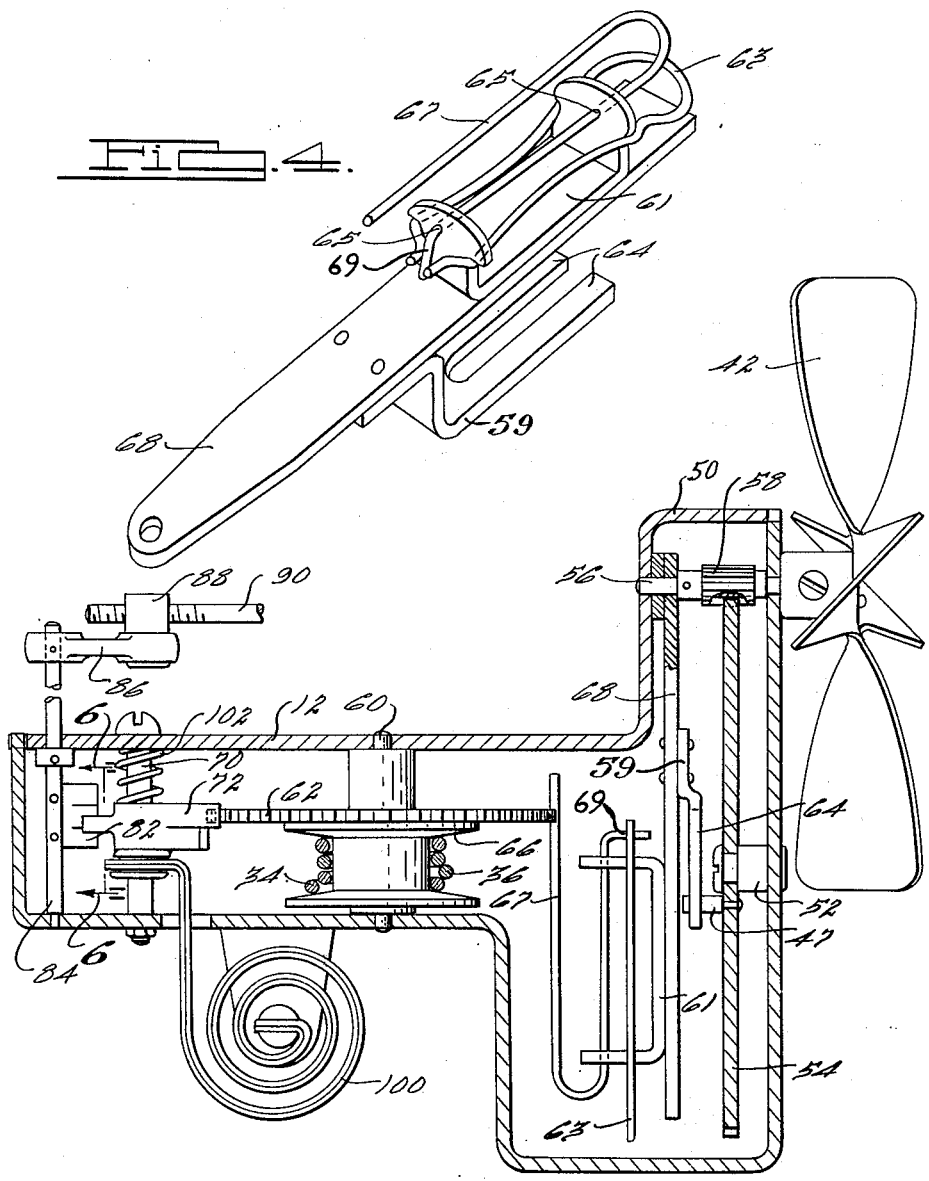
INVENTOR
Alwin B. Newton
BY
Harness and Harris
ATTORNEYS.

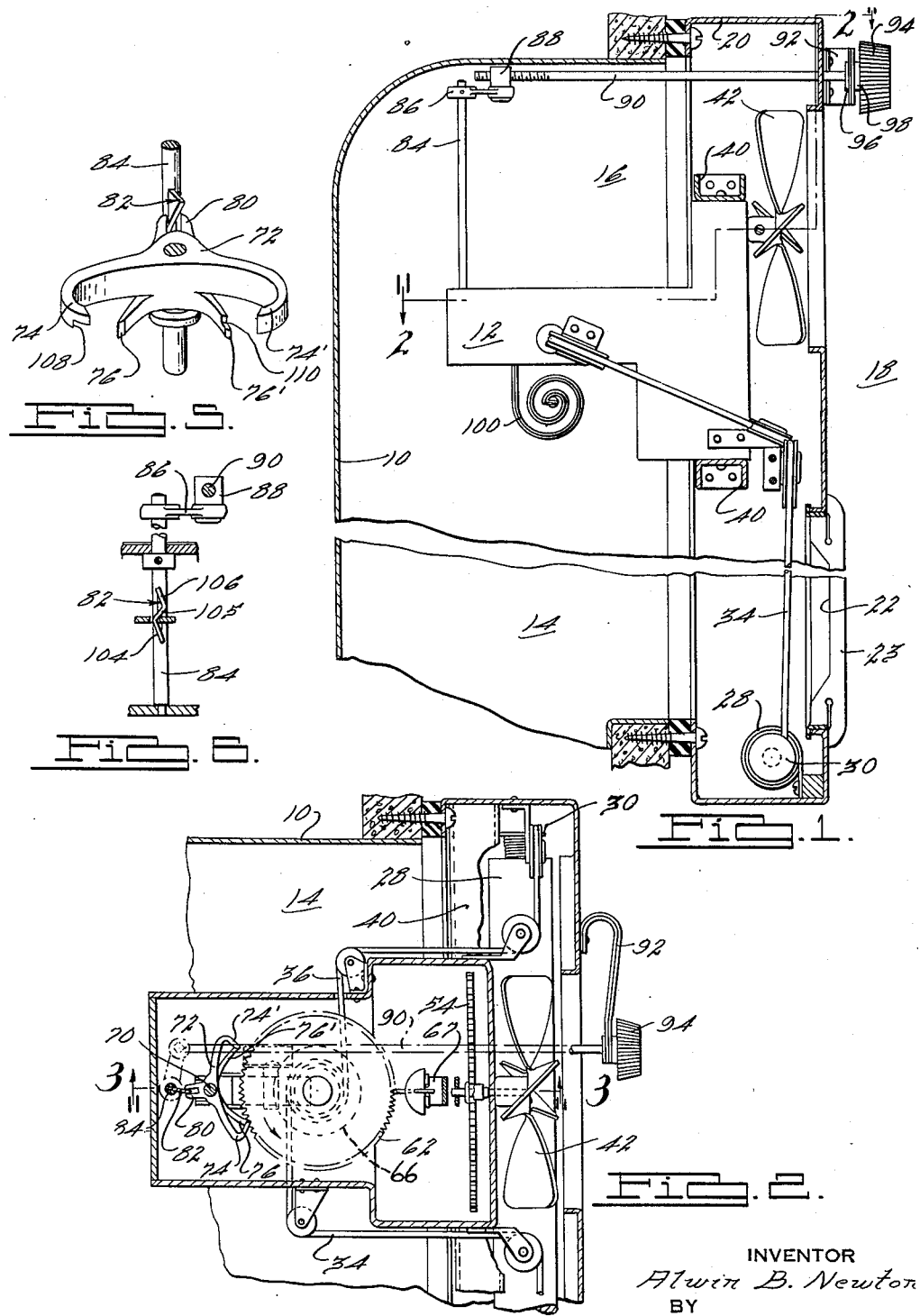

Patented Jan. 9, 1951

2,537,367

UNITED STATES PATENT OFFICE 2,537,367

DRIVE FOR AIR CONTROLLING GRILLES

Alwin B. Newton, Dayton, Ohio, assignor to Chrysler Corporation, Highland Park, Mich., a corporation of Delaware Application July 2, 1948, Serial No. 36,731

7 Claims. (Cl. 236—1)

This invention relates to air conditioning apparatus and more particularly to temperature responsive means for controlling the admission of conditioned air to a room.

My Patent No. 2,533,175 granted December 5, 1950, and copending application Serial Number 765,435, filed August 1, 1947, describe means for utilizing the movement of air being delivered by an air conditioning system as the motive power for opening or closing damper means controlling the delivery of air to a room.

It is a principal object of this invention to provide an improved drive mechanism for apparatus of this type. The mechanism to be described herein has been illustrated as associated with controls similar to those described in my copending application, Serial No. 765,435.

It is a further object of the invention to provide a driving mechanism in which forces are transmitted through springs and therefore subject to calculation. This is an improvement over the friction type of drive utilized in the copending application, Serial No. 765,435.

It is an additional object of the invention to provide a driving mechanism which is not subject to variations due to wear. The friction drive mechanism shown in copending application, Serial No. 765,435 contains elements which eventually would become worn by friction. The mechanism described herein combines positively interengageable elements with yieldable means to transmit drive through these elements.

It is an additional object of the invention to provide a drive mechanism particularly adapted to be completely encased to prevent dirt from accumulating on interengageable components.

It is also an object of the invention to provide a drive mechanism for a serrated disc which is adapted to move the disc through a predetermined arc at each interval of disc actuation. This is accomplished by moving the disc a distance corresponding to a definite number of serrations rather than utilizing a friction drive for an indefinite interval.

It is a further object of the invention to provide a ratchet coupling in the driving mechanism and to associate this coupling with means for reversing the drive in response to temperature changes.

Other objects and advantages of the invention will be apparent from the following description taken in connection with the accompanying drawings in which:

Fig. 1 is a vertical section of an individual air duct showing a damper therein and control apparatus adapted to regulate the position of the damper;

Fig. 2 is a plan view partly in section taken substantially on the line 2—2 of Fig. 1 which corresponds to the line 2—2 of Fig. 3;

Fig. 3 is a vertical sectional view taken substantially on the line 3—3 of Fig. 2;

Fig. 4 is a perspective view of the driving lever;

Fig. 5 is a perspective view of the ratchet element; and

Fig. 6 is an elevation of the operating lever taken on the line 6—6 of Fig. 3.

A duct 10 is provided for delivering air from an air conditioning apparatus to a room. A housing 20 is adapted to cover the end portion of the duct 10 and is secured to the wall of the room. A casing 12 positioned within the housing 20 and duct 10 substantially divides them into a compartment 14 and a compartment 16. The compartment 14 is adapted to deliver air to a room 18 for heating or cooling thereof. The compartment 16 is preferably positioned above the compartment 14 and arranged in fluid flow relationship with the duct 10 so that a portion of the air being delivered by the duct 10 to the room 18 will pass through the compartment 16. The housing 20 is provided with an opening 22 which is aligned with the compartment 14 and through which air is discharged from the compartment 14 to the room 18. Grille strips 23 may be associated with the opening, if desired. A damper which is preferably in the form of a curtain 28 is adapted to close off opening 22. The curtain 28 preferably is mounted on a roll member 30. The curtain 28 has one end thereof permanently affixed to the housing 20. By raising the roll member 30 the curtain 28 may be spread across the opening 22 to obstruct the passage of air from compartment 14 to room 18. The fluid flow connection of compartment 16 with duct 10 is unimpaired by the curtain so that the operation of the curtain 28 has no effect on the passage of air from duct 10 to compartment 16. A pair of cords 34 and 36 wound upon opposite ends of the roll member 30 and each passing over a plurality of pulleys extend upwardly into compartment 16.

Means to actuate the cords 34 and 36 to raise and lower the curtain 28 are provided in casing 12. The casing 12 is positioned within compartment 16 and supported by brackets 40 in housing 20. The means to actuate the cords includes a turbine 42 which is operatively connected to the apparatus in a manner to be described herein and which is positioned in axial alignment with an opening 44 provided in the housing 20 so that air from the duct 10 may be constantly discharged to the room 18 through the compartment 16 and opening 44 to actuate the turbine 42.

A stud 52 is supported in the casing 12 and has a gear 54 rotatably mounted thereon. The turbine 42 is keyed to a shaft 56 which is rotatably supported by the gear housing portion 50 of the casing 12. The shaft 56 carries a gear 58 which meshes with the gear 54 so that rotation of the turbine 42 is imparted to the gear 54 by means of the shaft 56 and gear 58. A vertical shaft 60 is rotatably supported by the top and bottom portions of the casing 12. A disc or ratchet wheel 62 having a serrated periphery is keyed to the shaft 60. A spool 66 is keyed to the shaft 60 and has portions of the cords 34 and 36 wound thereon.

The gear 54 has a pin 47 secured thereto. The pin 47 extends parallel to the axis of gear 54 and is eccentric thereto. A lever 68 which is illustrated in perspective in Fig. 4 is pivotally suspended from shaft 56. A bifurcated bracket 59 is secured to one side of the lever 68 and the legs 64 thereof straddle the pin 47. A bracket 61 is secured to the opposite side of lever 68 and carries a generally U-shaped spring element 63. The bracket 61 is provided with a pair of aligned openings 65 and a U-shaped wire pawl 67 is rotatably carried thereby. One end of pawl 67 is provided with a lateral extension or leg 69 which is received between the end portions of the legs of the U-shaped spring element 63 so that rotation of the pawl 67 in either direction is resisted by one leg of the resilient element 63. The other end portion of pawl 67 engages the serrated periphery of disc or ratchet wheel 62. When the gear 54 is rotated by means of the turbine 42 the eccentric motion of pin 47 in the slot between the legs 64 causes the lever 68 to oscillate as a pendulum. The pawl 67 is carried with lever 68 and thus it also tends to oscillate and as long as spring element 63 is not overcome the pawl 67 does not rotate in openings 65 and its oscillation rotates disc 62 through a small arc of alternate clockwise and counterclockwise movements. There is thus imparted to the shaft 60 and spool 66 a series of alternate clockwise and counterclockwise increments of motion.

Means are provided to utilize portions of the reciprocation of shaft 60 to selectively raise and lower the curtain 28 to thereby control the discharge of air from the duct 10 to the room 18. A shaft 70 is mounted in a vertical position between the upper and lower portions of the casing 12. A yoke 72 has formed thereon an upper and a lower ratchet element. The upper ratchet element comprises a pair of pawls 74 and 74' and the lower ratchet element comprises a pair of pawls 76 and 76'. The pawls project forwardly from the body portion of the yoke and are adapted to be selectively engaged with the serrations provided on the periphery of the disc 62. The yoke 72 is rotatably mounted on the shaft 70. A bifurcated element 80 extends rearwardly from the body portion of the yoke and is adapted to straddle an operating lever 82. The operating lever 82 is keyed to a vertical shaft 84 which is rotatably mounted in the casing 12. A lever 86 has one end thereof keyed to the shaft 84. The other end of the lever 86 carries a threaded nut 88. An adjusting rod 90 is threaded into the nut 88. A room temperature responsive thermostatic element 92 has one end thereof secured to the housing 20. The free end of the thermostatic element 92 has a manual adjustment knob 94 rotatably mounted thereon. The knob 94 is keyed to the adjustment rod 90. Suitable collars 96 and 98 are provided on the knob 94 to straddle the bimetallic element 92 so that rotation of the rod 94 and rod 90 adjusts the relationship between the bimetallic element 92 and the lever 82. Movement of the bimetallic element 92 caused by changes in temperature in the room 18 are transmitted through the rod 90, lever 86, shaft 84, and lever 82 to the yoke 72 which is rotated upon the shaft 70 so that an individual pawl of one of the pairs of pawls is engaged with the serrations on the disc 62. In Fig. 2 the pawl 74 is shown as engaging the serrations. A change in the room temperature would rotate the yoke 72 in a clockwise direction about the shaft 70 so that the pawl 74 would be disengaged from the serrations and the pawl 74' engaged therewith. Referring to Fig. 2 the pawl 74 is adapted to obstruct only counterclockwise rotation of the disc 62 while the pawl 74' is adapted to obstruct only clockwise rotation of the disc 62. When neither pawl is in engagement the disc oscillates freely. When one of the pawls is in engagement with the serrations the drive of disc 62 by wire pawl 67 produces rotation of shaft 60 in one direction only. The wire pawl 67 will rotate in openings 65 and deformation of one of the legs of spring 63 will accommodate this rotation when motion of the disc 62 in the corresponding direction is obstructed by a pawl on the yoke 72. With the pawl 74 in engagement as in Fig. 2 so that counterclockwise rotation of disc 62 is prevented the wire pawl 67 will oscillate with lever 68 and by engagement with a serration rotate disc 62 in a clockwise direction. On the return movement of lever 68 which occurs as an incident to its oscillation the wire pawl 67 will ratchet over a serration or serrations. Leg 69 will deform one of the legs of spring 63 to accommodate the ratcheting. Each rotation of the shaft 60 induced by movement of the disc 62 will move one or more serrations past the pawl 74. The summation of these increments of motion will by rotating the spool 66, gradually wind up the cords 34 and 36 and raise the curtain 28. When the room temperature changes sufficiently to cause the bimetallic element 92 to rotate the yoke 72 so that the pawl 74' engages the serrations only a counterclockwise movement of the disc 64 and spool 66 is permitted. This unwinds the cords 34 and 36 and lowers the curtain 28. The room temperature, therefore, determines the position of the curtain 28 and the amount of air delivered from the duct 10 to the room 18.

The above description which includes only reference to the upper ratchet element including pawls 74 and 74' is predicated upon the assumption that the air conditioning system delivers warm air to the duct 10. It is, however, common practice to use the same ducts for the delivery of cool air in the summertime. Means are described in my copending application, Serial No. 765,435 which automatically reverse the effect of the room thermostat 92 upon the position of the curtain 28. This is accomplished by a second bimetallic thermostatic element 100 which is exposed to the air delivered by duct 10. The lower ratchet element formed by pawls 76 and 76' is in an inoperative position during the winter months when heated air is delivered by the system. However, when the yoke 72 is lifted on the vertical shaft 70 the pawls 74 and 74' are lifted above the disc 62 and the pawls 76 and 76' are substituted therefor in the plane of the disc 62. The yoke 72 is slidably mounted on the shaft 70. One end of the bimetallic thermostatic element 100 is connected to the yoke 72 and adapted to lift the yoke 72 relative to the disc 62 when the bimetallic element 100 is cooled by the presence of cold air in the duct 10. A spring 102 is provided in concentric relation to the shaft 70 to yieldably resist the action of the bimetallic element 100. The lower pair of pawls 76 and 76' are divergent and engage the opposite face of individual serrations from the face engaged by the corresponding pawl in the upper pair. Referring to Fig. 2, it is clearly illustrated that if the engagement of the serrations by the pawls 76 and 76' is substituted for the engagement thereof by the pawls 74 and 74', the permissible direction of rotation of disc 62 is reversed. Thereby the rotation of the spool 66 and the direction of movement of cords 34 and 36 are reversed for a given position of the room temperature responsive bimetallic element 92.

The room temperature responsive bimetallic element 92 is unloaded temporarily each time a pawl moves from one serration to another on the disc 62. This minimizes distortion thereof due to mechanical loading of the bimetallic element by associated components. No heavy moving parts must be shifted by the bimetallic element 92 or the bimetallic element 100.

The operating lever 82 may be provided with a curvature as illustrated in Fig. 6. One result which may be achieved by such a curvature is that the local heating or cooling effect of the discharge airstream on the room temperature responsive bimetallic element 92 may be compensated for. The bifurcated portion 80 of the yoke 72 straddles the operating lever 82. The position of the yoke 72 relative to the shaft 70 is altered a predetermined amount as the temperature of the air delivered by the duct 10 changes. The curvature of lever 82 rotates yoke 72 as the latter is raised or lowered by thermostat 100. The slope of the curvature imparted to the operating lever 82 as shown in Fig. 6 is preselected.

By dividing the curvature of the lever 82 into laterally displaced portions 104 and 106 which are connected by an offset portion 105 the relationship of the bimetallic element 92 to the yoke 72 may be altered a preselected amount when a season changeover is made from delivering warm air to delivering cold air. It is a well known fact that human comfort requires a slightly cooler room temperature under winter conditions than under summer conditions. The progress of the bifurcated portion 80 of the yoke 72 to the left in Fig. 6 across the offset portion 105 of the operating lever 82 automatically provides such an adjustment in response to a material change in the temperature of the air delivered by the duct 10.

During the heating season or winter months to further compensate for heat radiation to cold walls human comfort requires a slight increase in room temperature as the outside temperature falls. The portion 104 is so shaped that its adjustment of operating lever 82 accomplishes this result as well as compensating for the effects of delivered air temperature on the room temperature responsive thermostat 92.

It is desirable to have the apparatus deliver air to the room for ventilation under conditions where the room air temperature is equal to the delivered air temperature. These conditions occur when the temperature of the delivered air is in the range of about 70° to 80° Fahrenheit since this is the usual range for a comfortable room temperature. It has been found that it is possible to assure that the damper 28 will be open under these conditions. This is accomplished by so constructing those pawls of the yoke 72 which are associated with a closing movement of the damper 28 that these pawls are inoperative when the temperature of air delivered by the duct is in the range of 70° to 80° Fahrenheit, for example. The pawls 74 and 76' are the pawls which in their respective seasons are adapted to so obstruct the rotation of the disc 64 in one direction that a closing of the damper 28 is effected. The lower portion of pawl 74 is notched at 108 and the upper portion of pawl 76' is notched at 110. The depth of the slots is preselected so that the disc 62 is aligned with these slots throughout all vertical movements of the yoke 72 under the influence of bimetallic element 100 in the preselected delivered air temperature range of 70° to 80° Fahrenheit. The spool 66 cannot, therefore, be so rotated as to close opening 22 with curtain 28 as long as the delivered air temperature is within the preselected range. All movements obtained during this interval are in a direction tending to lower the curtain 28 and, therefore, the curtain will eventually assume and maintain an open position under these conditions. The room 18 will be ventilated even though the temperature thereof is not altered by the discharge of air from duct 10.

I claim:

1. An apparatus for controlling the discharge of air from an air supply passage to a room having means dividing the outlet for said passage into first and second air discharge openings with damper means operable to restrict in varying degree the discharge of air from said first opening and control means deriving energy from the air discharged from said second opening to locate said damper means in response to the temperature of said room, said control means including an air driven turbine associated with said second opening, an element mounted for reciprocation, means operably connecting said turbine and said element and adapted to reciprocate said element in response to rotation of said turbine, a pawl associated with said element, a driven member having serrations and adapted to be driven by engagement of said pawl with said serrations, means controlled by the temperature of said room and operable to selectively obstruct the movement of said driven member in one direction, means operably connecting said driven member with said damper means so that movement of said driven member moves said damper means and means operably connecting said pawl with said element for reciprocation therewith and for relative movement therebetween when the movement of said driven member is obstructed by said temperature controlled means whereby a drive of said driven member is obtained in alternate directions as an incident to reciprocation of said pawl when the movement of said member is not obstructed by said temperature controlled means and an intermittent drive of said driven member by said pawl in one direction is obtained when said temperature controlled means obstructs movement of said driven member in the other direction.

2. An apparatus for controlling the discharge of air from an air supply passage to a room having means dividing the outlet for said passage into first and second air discharge openings with damper means operable to restrict in varying degree the discharge of air from said first opening and control means deriving energy from the air discharged from said second opening to locate said damper means in response to the demand for air in said room, said control means including an air driven turbine associated with said second opening, a lever mounted for reciprocation, means operable to translate rotation of said turbine into reciprocation of said lever, a rotatably mounted disc having a serrated periphery, means operatively connecting said disc with said damper means so that rotation of said disc moves said damper means, a pawl rotatably carried by said lever and adapted to engage the serrated periphery of said disc, yieldable means operable to resist rotation of said pawl relative to said lever, means controlled by the temperature of said room and operable to selectively obstruct the rotation of said disc in one direction whereby increments of movement in the other direction imparted to said disc by oscillation of said pawl provide a cumulative movement of said disc in one direction to position said damper means and said yieldable means facilitates a ratcheting of said pawl in a second direction over the serrated periphery of said disc when movement of said disc is obstructed in that direction.

3. An apparatus for controlling the discharge of air from an air supply passage to a room comprising a damper means having a plurality of positions adapted to restrict in varying degree the discharge of air from said supply passage and control means deriving energy from the air discharged from said passage to locate said damper means in different positions, said control means including an air driven turbine associated with said passage, a driven member operably connected to said damper means and adapted to move said damper means in response to movement of said driven member, a drive transmitting means interposed between said turbine and said driven member operable to alternately drive said driven member in a first and in a second direction and temperature responsive means operable to selectively obstruct movement of said driven member in one of said directions so that the cumulative effect of interrupted movements in the other direction produces a repositioning of said damper means, said drive transmitting means including a spring mechanism operable to accommodate continued rotation of said turbine while movement of said driven member is obstructed.

4. An apparatus for controlling the discharge of air from an air supply passage to a room comprising a damper means having a plurality of positions adapted to restrict in varying degree the discharge of air from said supply passage and control means deriving energy from the air discharged from said passage to locate said damper means in different positions, said control means including an air driven turbine associated with said passage, a ratchet wheel operably connected to said damper means and adapted to move said damper means in response to movement of said wheel, a drive transmitting means interposed between said turbine and said wheel, said drive transmitting means including a lever mounted for reciprocation, means to reciprocate said lever in response to rotation of said turbine, a first pawl for communicating motion from said lever to said wheel, a pair of pawls mounted for selective engagement with said wheel and each adapted to prevent motion of said wheel in one direction and temperature responsive means operable to selectively engage one of said pair of pawls with said wheel to thereby determine the direction of ratchet drive imparted to said wheel by reciprocation of said lever.

5. An apparatus for controlling the discharge of air from an air supply passage to a room comprising a damper means having a plurality of positions adapted to restrict in varying degree the discharge of air from said supply passage and control means deriving energy from the air discharged from said passage to locate said damper means in different positions, said control means including an air driven turbine associated with said passage, a ratchet wheel operably connected to said damper means and adapted to move said damper means in response to movement of said wheel, a drive transmitting means interposed between said turbine and said wheel, said drive transmitting means including a lever mounted for reciprocation, means to reciprocate said lever in response to rotation of said turbine, a first pawl for communicating motion from said lever to said wheel, resilient means operably connecting said pawl with said element for reciprocation therewith and for relative movement in either direction therebetween, a pair of pawls mounted for selective engagement with said wheel and each adapted to prevent motion of said wheel in one direction and temperature responsive means operable to selectively engage one of said pair of pawls with said wheel whereby a one-way driving connection is established between said lever and said wheel and the direction of one-way drive is dependent upon temperature conditions.

6. An apparatus for controlling the discharge of air from an air supply passage to a room comprising a damper means having a plurality of positions adapted to restrict in varying degree the discharge of air from said supply passage and control means deriving energy from the air discharged from said passage to locate said damper means in different positions, said control means including an air driven turbine associated with said passage, a ratchet wheel operably connected to said damper means and adapted to move said damper means in response to movement of said wheel, a drive transmitting means interposed between said turbine and said wheel, said drive transmitting means including a lever mounted for reciprocation, means to reciprocate said lever in response to rotation of said turbine, a first pawl for communicating motion from said lever to said wheel and a second pawl operable to prevent backward motion of said wheel whereby a ratchet drive of said wheel by said turbine is effected.

7. An apparatus for controlling the discharge of air from an air supply passage to a room having means dividing the outlet for said passage into first and second air discharge openings with damper means operable to restrict in varying degree the discharge of air from said first opening and control means deriving energy from the air discharged from said second opening to locate said damper means in response to the demand for air in said room, said control means including an air driven turbine associated with said second opening, a lever mounted for reciprocation, means operable to translate rotation of said turbine into reciprocation of said lever, a rotatably mounted disc having a serrated periphery, means operatively connecting said disc with said damper means so that rotation of said disc moves said damper means, a pawl rotatably carried by said lever and adapted to engage the serrated periphery of said disc, yieldable means operable to resist rotation of said pawl relative to said lever, means controlled by the temperature of said room and operable to selectively obstruct the rotation of said disc in one direction whereby increments of movement in the other direction imparted to said disc by oscillation of said pawl provide a cumulative movement of said disc in one direction to position said damper means and said yieldable means facilitates a ratching of said pawl in a second direction over the serrated periphery of said disc when movement of said disc is obstructed in that direction.

ALWIN B. NEWTON.

REFERENCES CITED

The following references are of record in the file of this patent:

UNITED STATES PATENTS

| Number | Name | Date |
| --- | --- | --- |
| 1,224,614 | Dougan | May 1, 1917 |
| 1,488,225 | Baetz | Mar. 25, 1924 |
| 1,883,735 | Hall | Oct. 18, 1932 |
| 2,028,571 | Smulski | Jan. 21, 1936 |
| 2,104,578 | Gaugler | Jan. 4, 1938 |
| 2,415,672 | Campbell | Feb. 11, 1947 |